US008127356B2

(12) United States Patent
Thiele et al.

(10) Patent No.: US 8,127,356 B2
(45) Date of Patent: Feb. 28, 2012

(54) SYSTEM, METHOD AND PROGRAM PRODUCT FOR DETECTING UNKNOWN COMPUTER ATTACKS

(75) Inventors: Frederic G. Thiele, Broomfield, CO (US); Michael A. Walter, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1933 days.

(21) Appl. No.: 10/650,440

(22) Filed: Aug. 27, 2003

(65) Prior Publication Data

US 2005/0050353 A1 Mar. 3, 2005

(51) Int. Cl.
*H04L 29/14* (2006.01)
*H04L 29/02* (2006.01)

(52) U.S. Cl. ............................................ 726/23; 726/22
(58) Field of Classification Search ........................ None
See application file for complete search history.

(56) References Cited

U.S. PATENT DOCUMENTS

| | | | |
|---|---|---|---|
| 5,991,881 A * | 11/1999 | Conklin et al. ................ 726/22 |
| 6,185,623 B1 * | 2/2001 | Bailey et al. ................. 709/238 |
| 6,304,975 B1 * | 10/2001 | Shipley ............................ 726/22 |
| 6,484,203 B1 | 11/2002 | Porras et al. ................. 709/224 |
| 6,853,619 B1 * | 2/2005 | Grenot ........................... 370/232 |
| 2002/0087882 A1 | 7/2002 | Schneier et al. ............. 713/201 |
| 2002/0116512 A1 * | 8/2002 | Amit et al. .................... 709/230 |
| 2002/0131369 A1 * | 9/2002 | Hasegawa et al. ............ 370/241 |
| 2002/0133606 A1 | 9/2002 | Mitomo et al. ............... 709/229 |
| 2002/0138755 A1 | 9/2002 | Ko ................................. 713/201 |
| 2002/0184528 A1 | 12/2002 | Shevenell et al. ............. 713/201 |
| 2002/0194490 A1 | 12/2002 | Halperin et al. .............. 713/200 |
| 2003/0065948 A1 | 4/2003 | Wilkes .......................... 713/201 |
| 2003/0084349 A1 | 5/2003 | Friedrichs et al. ............ 713/201 |
| 2003/0088791 A1 | 5/2003 | Porras et al. .................. 713/201 |
| 2003/0093682 A1 | 5/2003 | Carmona et al. .............. 713/187 |
| 2003/0145228 A1 * | 7/2003 | Suuronen et al. ............. 713/201 |
| 2003/0212821 A1 * | 11/2003 | Gillies et al. .................. 709/238 |
| 2003/0225722 A1 * | 12/2003 | Brown et al. ...................... 707/1 |
| 2004/0015582 A1 * | 1/2004 | Pruthi ............................ 709/224 |
| 2004/0078592 A1 * | 4/2004 | Fagone et al. ................. 713/201 |

OTHER PUBLICATIONS

Stallings, William. "Intruders." Cryptography and Network Security-Principles and Practices. 3 Ed. Upper Saddle River, NJ: Prentice Hall, 2003. 580-581.*

* cited by examiner

*Primary Examiner* — Minh Dinh
*Assistant Examiner* — Venkat Perungavoor
(74) *Attorney, Agent, or Firm* — Arthur J. Samodovitz

(57) ABSTRACT

A computer system and program product for automatically determining if a packet is a new, exploit candidate. First program instructions determine if the packet is a known exploit or portion thereof. Second program instructions determine if the packet is network broadcast traffic presumed to be harmless. Third program instructions determine if the packet is network administration traffic. If the packet is a known exploit or portion thereof, network broadcast traffic, or network administration traffic, the packet is not considered a new, exploit candidate. If the packet is not a known exploit or portion thereof, network broadcast traffic, or network administration traffic, the packet is an exploit candidate. Alternately, the first program instructions determine if the packet is a known exploit or portion thereof. The second program instructions determine if the packet is network broadcast traffic presumed to be harmless. Third program instructions determine if the packet is another type presumed or known from experience to be harmless. If the packet is a known exploit or portion thereof, network broadcast traffic, or the other type, the packet is not considered a new, exploit candidate. If the packet is not a known exploit or portion thereof, network broadcast traffic, or the other type, the packet is an exploit candidate.

20 Claims, 6 Drawing Sheets

SYSTEM, METHOD AND PROGRAM PRODUCT FOR DETECTING UNKNOWN COMPUTER ATTACKS

FIELD OF THE INVENTION

The invention relates generally to computer systems, and deals more particularly with a technique to detect unknown computer attacks.

BACKGROUND

Computer attacks are common today. Some examples of computer attacks are buffer overflow attacks, malformed URL attacks, brute force attacks, viruses and worms. Most attacks are malicious in intent. Computer attacks are typically received via a network intranet or Internet interface targeted at the operating system or an installed service. While computer firewalls can prevent some types of malicious attacks they should not be considered a complete solution for stopping a malicious hacker from penetrating a computer on a network.

A computer virus is a computer program that is normally harmful in nature to a computer user. Computer viruses are received via several media, such as a computer diskette, e-mail or vulnerable program. Once a virus is received by a user, it remains "dormant" until it is executed by the user (or other program). The main difference of a virus versus a worm is the need for the user or program to execute the virus program for it to spread and infect others.

A computer worm is a computer program similar to a computer virus, except that a computer worm does not require action by a person to become active. A computer worm exploits some vulnerability in a system to gain access to that system. Once the worm has infected a particular system, it replicates by executing itself. Normally, worms execute themselves and spawn a process that searches for other computers on nearby networks. If a vulnerable computer is found, the worm infects this computer and the cycle continues.

Most computer attacks have a characteristic "signature" by which the attack can be identified. The signature can take various forms depending on the nature of the attack, but typically comprises several consecutive lines of plain text or executable code that are distinctive and appear in the attack. Once a signature is determined for a new computer attack, intrusion detection or intrusion prevention software can be created and distributed to customers. The intrusion detection or intrusion prevention software detects the attack from a network interface card (NIC) or when the attack attempts to pass through a firewall. The detection is by a "key word" search for the signature of the attack. The intrusion prevention or intrusion detection software will then thwart the attack by deleting it or preventing its execution by appropriate command to the operating system.

It is important to identify new computer attacks (and their signatures), as soon as possible after the new attack is released. Then, its signatures can be identified and the intrusion prevention or intrusion detection software can be created and distributed to customers.

Likewise, it is important to detect a manual attempt to "hack" a victim's server or workstation, whereby a (hacker) person at a remote workstation attempts in real time to gain access to the victim's server or workstation. This typically begins by the hacker entering many combinations of userIDs and passwords, hoping that one such combination will gain access to sensitive software or data in the server or workstation. Hacking can also be facilitated if there is an improper configuration to a server which allows unknown third parties to gain administrative authority to a program or data base. After a hacking, there will usually be some residual evidence in log files or as binary executable code, as deleted or modified system files, etc.

A hacker may also transmit exploitation code to the victim's server or workstation, which code automatically exploits vulnerabilities in a victim's server, as would a hacker do manually. For example, a buffer overflow attack exploitation program exploits a vulnerability, typically caused by programmer error, that allows for arbitrary code execution on the target system. As another example, an attacker can inject special machine code into a program variable (usually input by a user) to cause arbitrary code execution in a program. This special code, once given to the program to execute, is placed in the correct area of computer memory, such that the executing program is unaware of the malicious intent of the injected code. There are several classes of buffer overflow, including format string, remote and local. It is important to thwart hackers (as well as viruses and worms).

An Intrusion Detection System ("IDS") is currently known and has a known (i.e. "used") address to detect known computer attacks by matching key aspects of that attack to a known "signature". The IDS is associated with an enterprise, and has a list of known signatures of known viruses and worms, and other common attacks. The IDS searches each packet it receives for the known signatures, and thereby detects when the enterprise is being "attacked" by virus, worm or any other attack which has a known signature. When this occurs, the IDS notifies a security operations center ("SOC"), and the SOC will check that the proper anti-virus, anti-worm or other intrusion protection software is currently installed in the enterprise or customer network. While the IDS is effective in safeguarding an enterprise against known "exploits" (for example, computer viruses, worms and exploitation code), it does not identify or safeguard against new exploits for which the signatures are not yet known.

A "honeypot" is currently known to collect suspicious Internet message packets. The honeypot is a device such as a server, workstation or embedded device (for example, an old workstation, Single Board Computer (SBC) or de-commissioned server) that has an IP address on the Internet or company intranet, but the IP address is unused, i.e. the device has no function that requires input or service from any other server or workstation, the IP address is not registered with a domain name service, the IP address is not sent or broadcast to any other server or workstation, and the honeypot is not serving any useful function to the enterprise or network (other than gathering information). So, all packets sent to the honeypot are unsolicited and suspect. It is known for a human analyst to analyze all of the packets received by the honeypot to determine their type and whether they represent a known or unknown computer attack. For example, the analyst will determine which packets are harmless broadcast traffic, network administration, or web crawler requests. The analyst will also look for harmful known viruses, worms, and exploitation code contained in the packets. The analyst will also look at residual evidence of hacking in the honeypot (for example, changes to data bases, software, system files, etc.). The analyst will also identify new computer attacks by filtering through network packets (logged by the honeypot) for known attacks. Once known attacks are filtered, the analyst has a smaller set of data to analyze. This smaller set of data is scrutinized for anything suggesting a new attack. Packets must have a purpose or be explained before they are discounted as known or harmless. While the foregoing human analysis of the honeypot process is effective, it is time consuming, requires a computer savvy human to make the analysis and is prone to error. Also, the shear number of packets received by the honeypot delays the detection of new computer attacks, viruses, computer worms and exploitation code.

Therefore, an object of the present invention is to facilitate the identification of new computer viruses, worms, exploitation code or other unwanted intrusions.

SUMMARY OF THE INVENTION

The invention resides in a computer system and program product for automatically determining if a packet is a new, exploit candidate. First program instructions determine if the packet is a known exploit or portion thereof. Second program instructions determine if the packet is network broadcast traffic presumed to be harmless. Third program instructions determine if the packet is network administration traffic. If the packet is a known exploit or portion thereof, network broadcast traffic, or network administration traffic, the packet is not considered a new, exploit candidate. If the packet is not a known exploit or portion thereof, network broadcast traffic, or network administration traffic, the packet is an exploit candidate.

According to one feature of the present invention, fourth program instructions determine if the packet is web crawler traffic. If the packet is a known exploit or portion thereof, network broadcast traffic, network administration traffic or web crawler traffic, the packet is not considered a new, exploit candidate. If the packet is not a known exploit or portion thereof, network broadcast traffic, network administration traffic or web crawler traffic, the packet is an exploit candidate.

The invention also resides in a computer system and program product for automatically determining if a packet is a new, exploit candidate. First program instructions determine if the packet is a known exploit or portion thereof. Second program instructions determine if the packet is network broadcast traffic presumed to be harmless. Third program instructions determine if the packet is another type presumed or known from experience to be harmless. If the packet is a known exploit or portion thereof, network broadcast traffic, or the other type, the packet is not considered a new, exploit candidate. If the packet is not a known exploit or portion thereof, network broadcast traffic, or the other type, the packet is an exploit candidate.

DETAILED DESCRIPTION OF THE PREFERRED EMBODIMENTS

Figure 1:
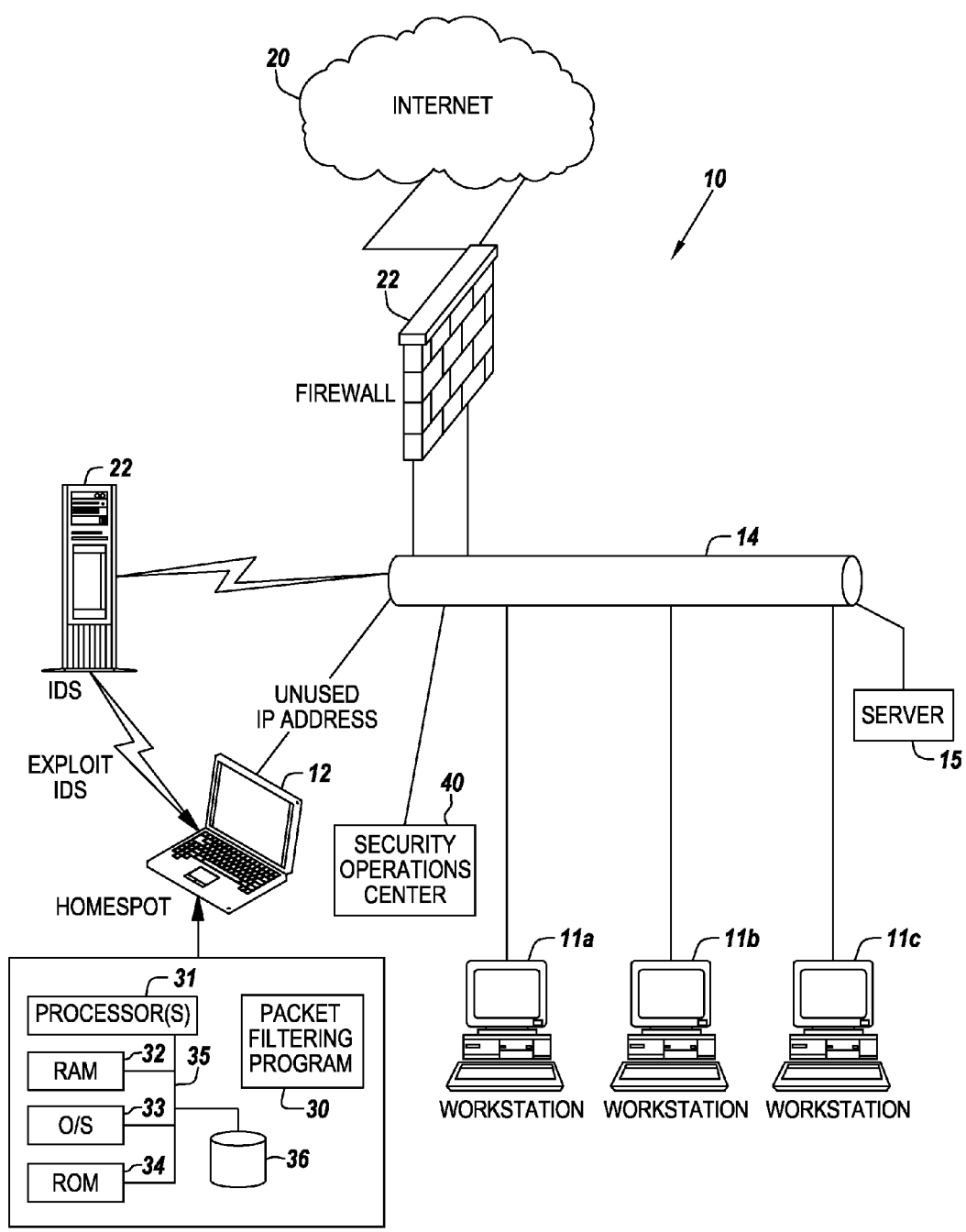
FIG. 1 is a block diagram of a computer system in which the invention is embodied.

Referring now to the drawings in detail wherein like reference numbers indicate like elements throughout, FIG. 1 illustrates a computer system generally designated 10. System 10 comprises a multiplicity of known work stations 11a,b,c on an intranet 14. By way of example, intranet 14 is an Ethernet intranet, although intranet 14 could alternately be an Ethernet Internet, Ethernet private network, TokenRing Network, etc. System 10 also comprises a honeypot 12 connected to the intranet 14. Honeypot 12 receives messages from Internet 20 via the intranet 14. Typically, the messages are in the form of ATM packets where a sequence of packets forms each message. However, the present invention will accommodate other types of packets and messages as well. Honeypot 12 can be a server, workstation, embedded device such as a Single Board Computer (SBC), USB hard drive or other custom computer, small network appliance or other electronic device with an IP address. Honeypot computer 12 includes one or more processors 31, Random Access Memory 32, operating system 33 and Read Only Memory 34 on a bus 35, and a disk storage device 36 coupled to bus 35. Honeypot 14 preferably has an unused IP address, i.e. the device has no function that requires input or service from any other server or workstation, the IP address is not registered with a domain name service, and the IP address is not sent or broadcast to other servers or workstations. So, any packets, particularly non broadcast packets, sent to the honeypot 12 are unexpected and therefore, suspect. Intranet 14 is connected to the Internet 20 via firewall 22, such that honeypot 12 (and workstations 11a,b,c) is coupled to the Internet to receive IP packets from other devices (i.e. servers, workstations, routers, etc.) on or coupled to the Internet. By way of example, firewall 22 performs the following functions to limit what packets can pass from the Internet 20 to the intranet 14: accepts packets only from certain IP protocols, sends packets only to certain ports, accepts packets only from certain IP addresses, denies traffic from entire subsets of IP addresses and accepts packets only from certain applications, in addition to many other similar functions. However, if desired, honeypot 12 can be directly connected to the Internet 20 without an intervening intranet and/or firewall.

In accordance with the present invention, honeypot 12 includes a honeypot packet filtering program 30 (FIG. 2) which reviews all packets received by the honeypot 12, and filters out those packets which are not portions of exploits (i.e. computer viruses, worms, exploitation programs, etc.), or which are portions of old exploits with known signatures. A known security operations station ("SOC") 40 is coupled to the intranet 14 and to honeypot 12. The SOC includes human analysts which review exploit or intrusion alerts for authenticity. If an intrusion is deemed authentic, or not a false positive, the customer is called and informed that they are under attack. Honeypot 12 sends to SOC 40 only those packets which pass through the filtering program 30, and therefore warrant further analysis as portions of potential new exploits. It is not necessary for SOC 40 to analyze the packets which are not portions of exploits because they do not pose a security concern. Also, it is not necessary for SOC 40 to analyze the packets which are portions of known/old exploits because they have already been detected, and the respective anti virus, anti worm or anti exploitation program software has already been created and distributed. Program 30 is stored in disk storage device 36 for execution by one or more processors 31 via RAM 32.

Figure 2:
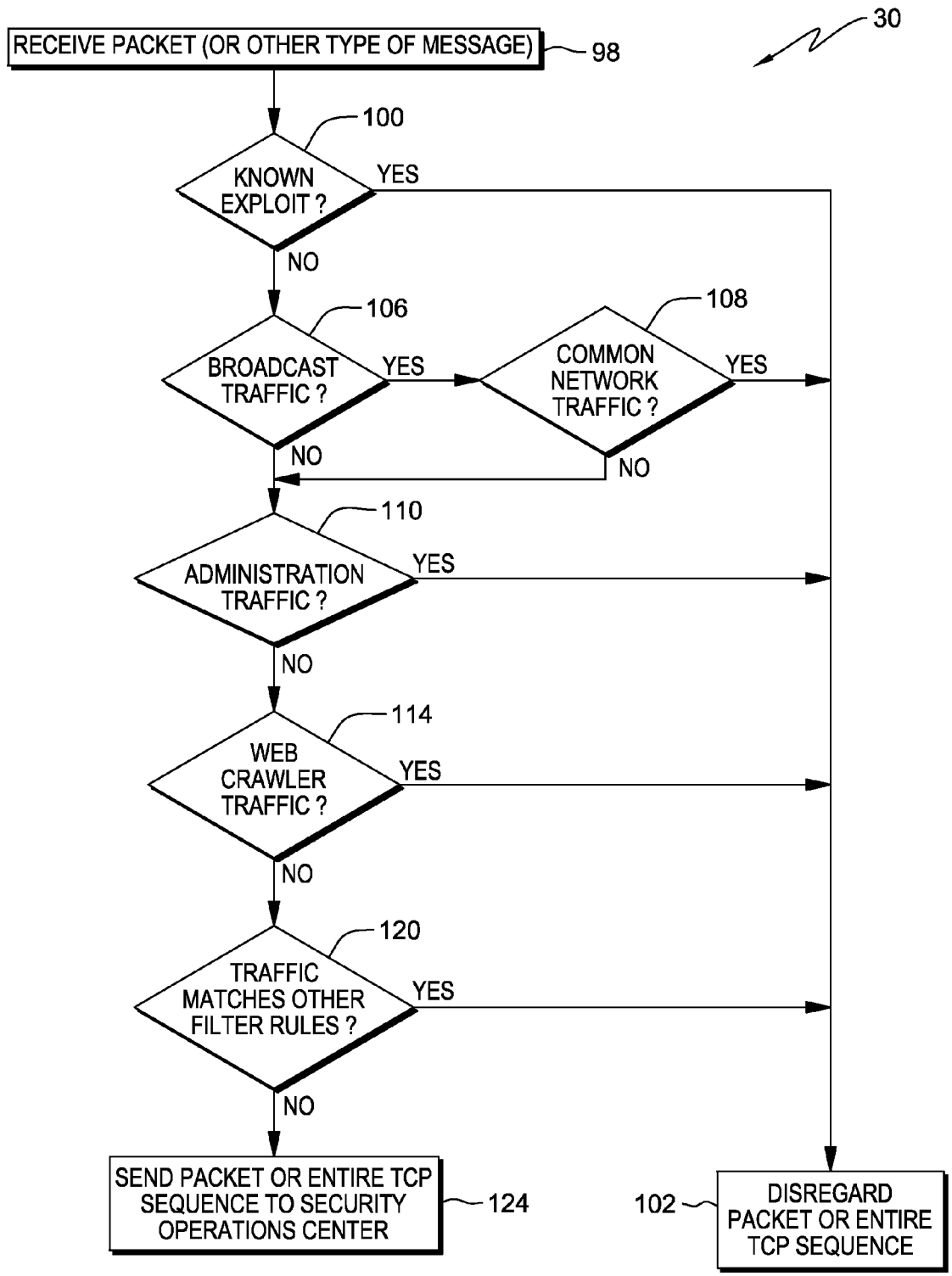
FIG. 2 is a flow chart illustrating a honeypot packet filtering program within the computer system of FIG. 1.

FIG. 2 illustrates the honeypot packet filtering program 30 in detail. Program 30 performs the steps illustrated in FIG. 2 for each packet which it receives (step 98). In step 100, program 30 determines if the packet contains a portion of a known exploit with a known signature. If so, program 30 stores the packet but "disregards" it, i.e. does not consider it further as a new exploit candidate and will not send it to SOC 44 for further analysis (step 102). As explained in more detail below, program 30 may also disregard the other packets it receives in the same TCP sequence such that the entire message is disregarded (step 102). The reason for disregarding this packet or sequence of packets is because the function of honeypot 12 is to identify new exploits, for which a signature is not yet known.

If the current packet is not a portion of a known exploit, then program 30 determines if the packet is network broadcast traffic, i.e. packets which are sent to every IP address on the network (decision 106). Examples of network broadcast traffic are address resolution protocol ("ARP") queries (i.e. broadcast of a domain name soliciting the owning server to respond with its IP address), other types of domain name service ("DNS") queries, Simple Network Management Protocol ("SNMP") queries (i.e. broadcasts to find information about devices on the network), http traffic, telnet or ssh (decision 106). In the illustrated environment, the ARP, DNS and SNMP queries are considered common network broadcast traffic, whereas ssh and http are not considered common network broadcast traffic. If an exploit is not broadcast, yet is sent to honeypot 12 with its "unused" IP address, then it is suspect. Therefore, in such a case, the "no branch" of decision 106 keeps the packet in contention as being an exploit candidate. However, if the current packet is network broadcast traffic (decision 106, yes branch), then program 30 determines if the packet is "common" network traffic such as the ARP, DNS or SNMP broadcast query which is presumed to be harmless (decision 108). If so, then program 30 proceeds to step 102 as described above. Program 30 disregards this packet or TCP sequence of packets because program 30 is not interested in harmless packets. Referring again to decisions 106 and 108, if the packet is not network broadcast traffic (decision 106, no branch), or is network broadcast traffic but not common network traffic (decision 108, no branch), then program 30 determines if the packet is network administration traffic (decision 110). Examples of network administration traffic are secure shell ("SSH") traffic to remotely install a patch or change configuration or virtual network computing ("VNC") traffic or terminal services traffic to create a remote server desktop to remotely add a userID, or install a patch or change configuration (decision 110). If the packet is network administration traffic, it is presumed to be harmless, and honeypot 12 proceeds to step 102 as described above. If not, then program 30 determines if the packet is web crawler traffic, i.e. harmless packets sent out by servers to gather information for their respective data bases (decision 114). If so, then honeypot 12 proceeds to step 102 as described above. If not, then program 30 determines if the packet matches an additional "filter rule", usually specific to the environment in which the honeypot 12 is deployed (decision 120). For example, if the intranet 14 often receives messages of a certain type that were not filtered out in the foregoing decision blocks 100, 108, 110 or 114, and these types of messages are presumed to be harmless or determined from experience to be harmless, then they should be disregarded. Different intranets have different server functions, and therefore receive different concentrations of packets. Consequently, the "filter rules" may be geared for the type of server on the intranet, to filter out concentrations of harmless packets that the intranet routinely receives. The filter rule(s) of step 120 can also be determined based on past experience. If there are many packets of a certain type sent to SOC 40 as new exploit candidates, and this type of packet is consistently determined not to be part of a new exploit, i.e. false positives, then a new filter rule can be defined for decision 120 directed to filter out and disregard this type of false positive. If the packet matches a filter rule (decision 120, no branch), then honeypot 12 proceeds to step 102 as described above. If not, program 30 sends the current packet or the entire TCP sequence of related packets which includes the current packet, as an alert to SOC 40 for further analysis as a fully filtered, new exploit candidate (step 124). (After a packet is received by honeypot 12 and passes through the first filter, i.e. decision 100, no branch, it is considered a new exploits candidate, although it is only partially filtered. The packet remains an exploit candidate unless and until it is filtered out by the "yes branch" of any of decisions 100, 108, 110, 114 or 120.) In accordance with the objects of the present invention, program 30 filters out many packets it receives (as explained above) that are not new exploit candidates. This eases the burden on SOC 40, and expedites the identification of new exploits by SOC 40.

Figure 3:
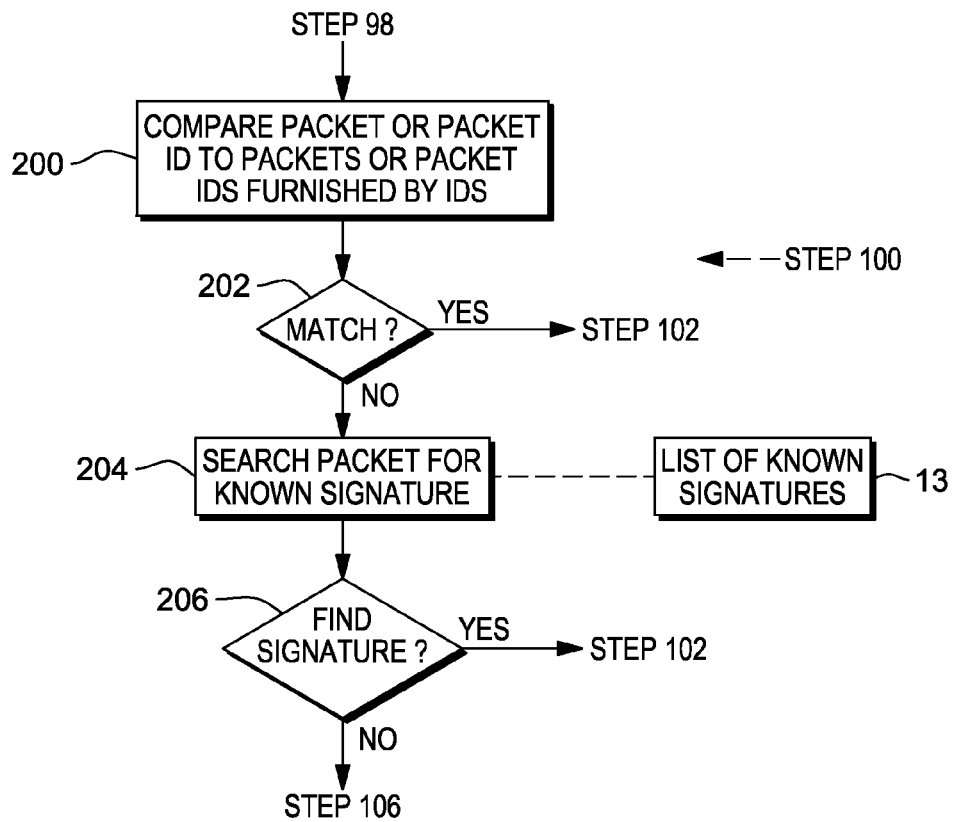
FIG. 3 is a flow chart illustrating a program function within the honeypot packet filtering program of FIG. 2 which determines if the packet contains a portion of a known exploit program.

FIG. 3 illustrates in more detail step 100 of FIG. 2 (i.e. determining if the packet contains a portion of a known exploit). In the illustrated embodiment of the present invention, a known intrusion detection system ("IDS") 22 is connected to the intranet 14 and to honeypot 12. The IDS 22 has a current list of signatures of known viruses, worms, exploitation programs and other exploits. The IDS performs a key word search of the packets it receives, searching for these known signatures. When the IDS detects such an exploit or a portion thereof in a packet it receives based on the presence of the key words in the packet, the IDS sends the packet in an alert or identifies the packet in an alert to program 30 in the honeypot 12. The identification can be in the form of a TCP sequence number of the current packet or the sequence of packets which includes the current packet. The TCP sequence is a sequence of packets that together form one packet. (TCP packets have a sequence number because the packets often arrive at their destination out of order. This is because the packets may take different routes to the destination. The TCP sequence numbers are used to reassemble the packets at their destination.) (Other types of messages or packets can be identified in the alert by other means appropriate to the type of message or packet.) In the illustrated embodiment of the present invention, for each packet received by honeypot 12 in step 98, program 30 compares it to the packets previously furnished or identified by IDS 22 in the alerts (step 200). This comparison is made by comparing the headers in the packets for common identification information or comparing the attribute of the packet, such as its TCP sequence number, furnished by the IDS in the alert (step 202). In the illustrated embodiment of the present invention, honeypot 12 also maintains a list 13 of known signatures of known exploits. Also, program 30 includes a known type of program function to search each packet received by the honeypot for one of the known signatures to detect a known exploit or portion thereof.

Program 30 performs this search for those packets which do not match a packet identified by the IDS 22 in the alert (step 204). The reason for step 204 is that honeypot 12 may receive some packets that IDS 22 does not receive, and therefore, it is possible that honeypot 12 will receive a packet containing a portion of an exploit which IDS 22 did not identify in an alert. Also, it is possible that the list of signatures of known exploits is different in IDS 22 versus honeypot 12. If the current packet matches any packet previously furnished by IDS 22 in an alert (decision 202, yes branch) or is identified by program 30 as a known exploit by the foregoing signature search function within program 30 (decision 206, yes branch), then program 30 proceeds to step 102 as described above. Otherwise, program 30 proceeds to step 106, as described above. In another embodiment of the present invention, IDS 22 is not used at all, and step 200 and decision 202 are not performed. Instead, program 30 relies only on its own list 13 of known signatures of known exploits and its own intrusion signature search function to search and identify packets containing known exploits (step 204 and decision 206).

Figure 4:
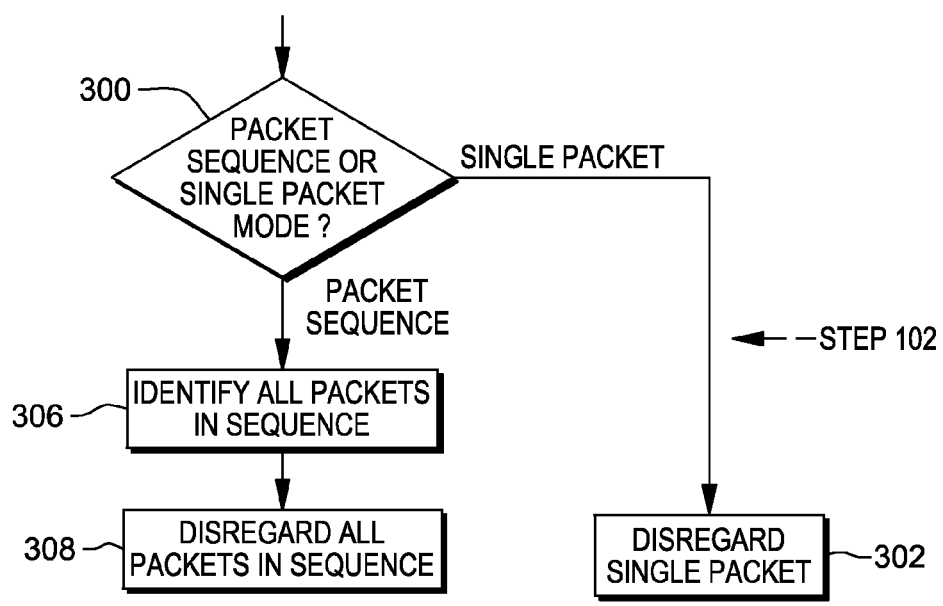
FIG. 4 is a flow chart illustrating a program function within the honeypot packet filtering program of FIG. 2 which disregards a current packet or a sequence of packets including the current packet.

FIG. 4 illustrates in more detail step 102 of FIG. 2 (disregarding a current packet or a sequence of packets including the current packet). In one embodiment of the present invention, there is an option for the user of honeypot 12 to select whether to disregard the current packet only, or to automatically disregard all the packets in the respective sequence of packets. In the former case (decision 300, "single packet" branch), program 30 disregards only the current packet (step 302). In the latter case (decision 300, "packet sequence" branch), program 30 identifies and gathers the entire TCP sequence of related packets (which include the current packet) (step 306). This identification is based on the similarity of the sequence numbers contained in the headers of the packets. To facilitate the identification, program 30 can reassemble the packets into their proper order in the sequence. There are currently known methods that can identify which TCP packets are part of the same sequence and to reassemble these packets into the sequence. So, for packets received in the last few seconds or for new packets which arrive in the next few seconds, program 30 determines if they are part of the same sequence as the current packet. Any such packets in the same sequence are disregarded in step 308.

Figure 5:
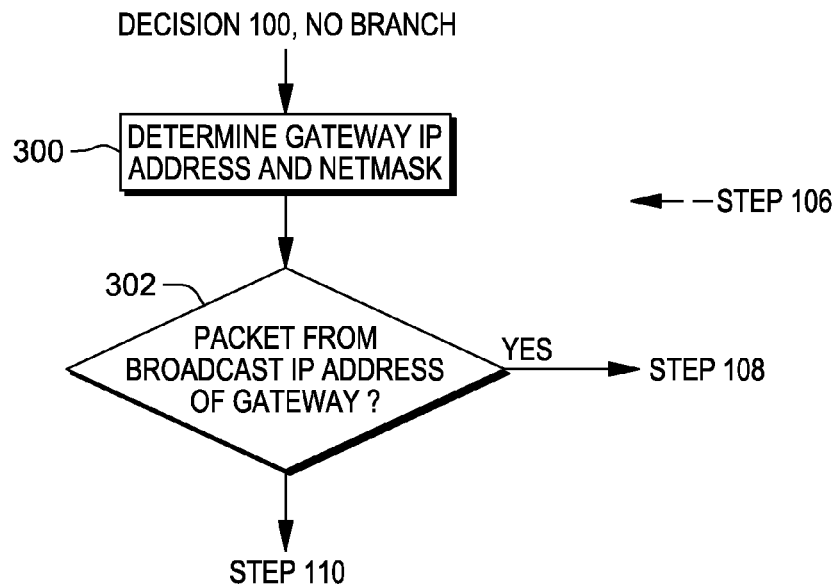
FIG. 5 is a flow chart illustrating a program function within the honeypot packet filtering program of FIG. 2 which determines if the current packet is broadcast traffic.

FIG. 5 illustrates in more detail step 106 of FIG. 2 (i.e. determining if the current packet is broadcast traffic). In step 300, program 30 determines the gateway IP address and the netmask of the network on which the honeypot resides. This can be gained by system calls to the honeypot. The gateway IP address is the IP address of a router or other device in the network which received the packet from the Internet, and forwarded the packet to the honeypot 12 (and possibly other devices on intranet 14). The netmask indicates how many IP addresses are available in the network, ex. one through sixty four. From the gateway IP address and netmask, program 30 determines whether the destination IP address in the packet header is the broadcast IP for this network. In other words, if the IP address packet header is destined for the broadcast IP address of the network, then program 30 knows that the packet was "broadcast traffic", and every device, including workstations 11a,b,c, on intranet 14 received the packet (step 302). In such a case, program 30 proceeds to step 108 as described above to further determine the nature of the broadcast traffic. However, if the packet is not broadcast traffic, then program 30 proceeds to step 110 as described above. A packet targeted (not broadcast) to the unused IP address of honeypot 12 is suspect.

Figure 6:
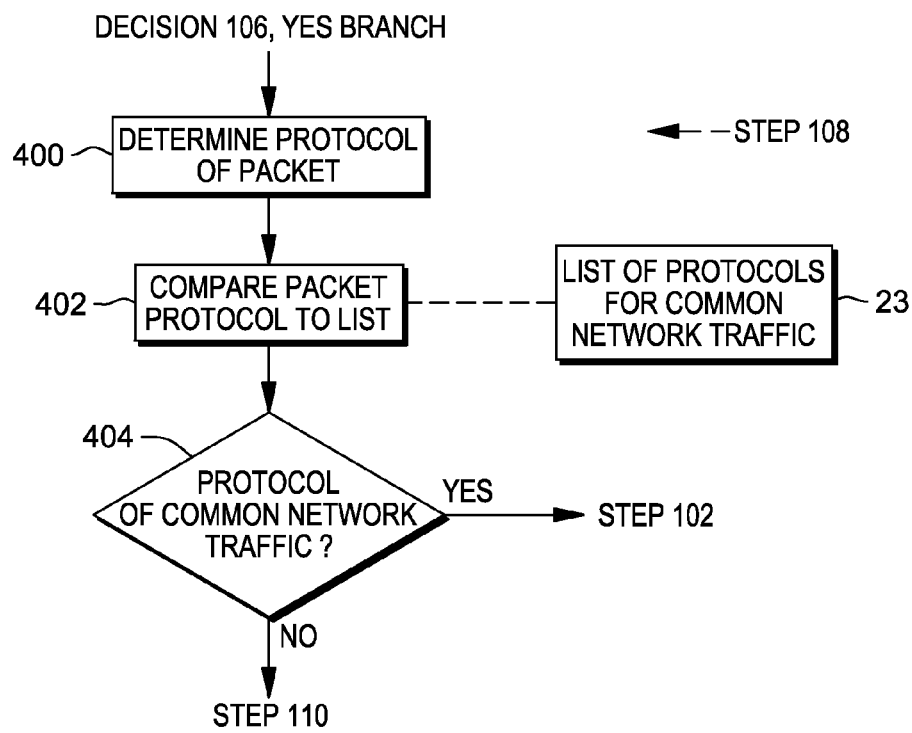
FIG. 6 is a flow chart illustrating a program function within the honeypot packet filtering program of FIG. 2 which determines if the current packet is harmless, common network traffic.

FIG. 6 illustrates in more detail step 108 of FIG. 2 (i.e. determining if the current packet is common network broadcast traffic assumed to be harmless). Honeypot 12 maintains a list 23 of common broadcast traffic protocols for intranet 14, for example, ARP, SNMP and DNS, although this list is customized for the environment of honeypot 12 and considers such factors as the type/role of devices on the intranet 14. For example, if the intranet includes a printer which is driven by SNMP protocol, then SNMP traffic for that printer would be in list 23. As another example, if DNS traffic is commonly broadcast on this network from a specific DNS server, then that DNS servers DNS traffic would be in list 23. All packets conforming to the common broadcast protocols in list 23 are probably harmless. In step 400, program 30 determines the protocol of the current packet by parsing the header; the header states the protocol. Then, program 30 compares the protocol and source IP address of the current packet to those in list 23 (step 402). If there is a match (decision 404, yes branch), the packet is considered harmless, and program 30 proceeds to step 102 as described above. However, if there is not a match, then program 30 proceeds to decision 110, as described above.

Figure 7:
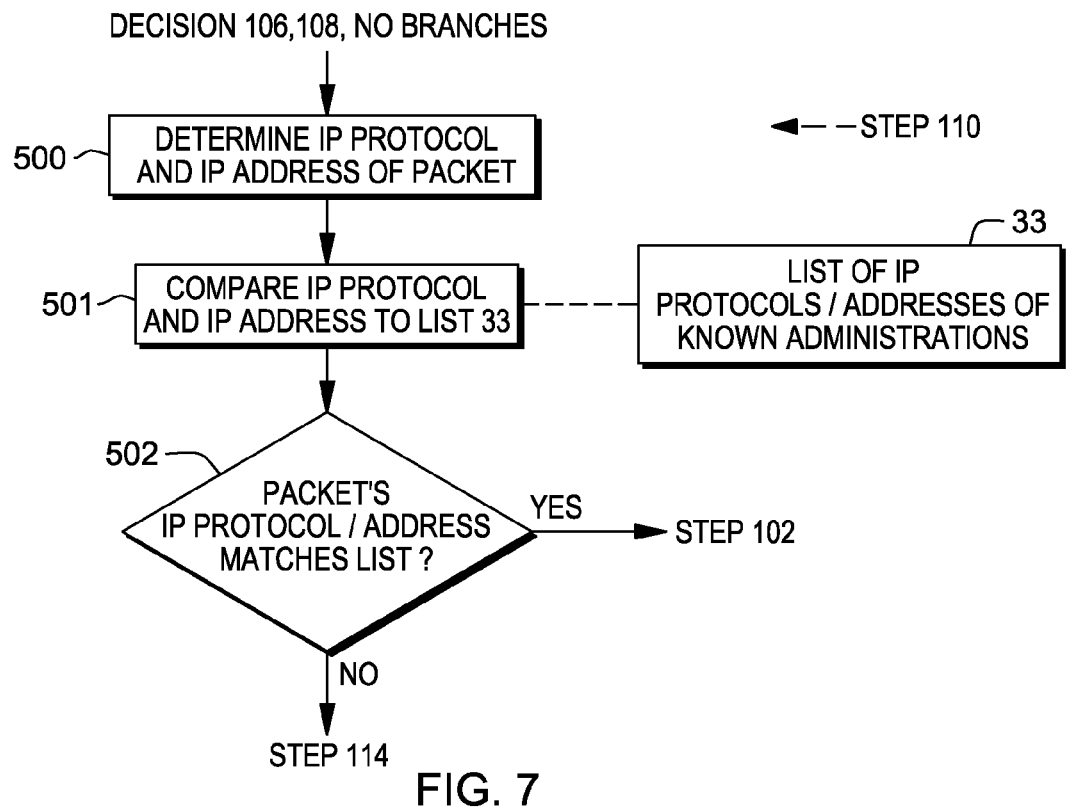
FIG. 7 is a flow chart illustrating a program function within the honeypot packet filtering program of FIG. 2 which determines if the current packet is harmless network administration traffic.

FIG. 7 illustrates in more detail decision 110 of FIG. 2 (i.e. determining if the current packet is network administration traffic presumed to be harmless). Some or all bonafide network administrators are known to the administrator of intranet 14 by their combinations of IP protocol and respective IP address. These combinations were entered by the administrator and stored in a list 33 within honeypot 12. (Examples of the protocols used by a network administrator are SSH and Tellnet.) So, program 30 determines the IP protocol and IP address of the current packet by parsing the packet header (step 500). Then, program 30 compares the combination of IP protocol and IP address of the current packet to the combinations on the list 33 (step 501). If there is a match (decision 502, yes branch), then the current packet is deemed harmless network administration traffic, and program 30 proceeds to step 102 as described above. If there is no match, then program 30 proceeds to decision 114 as described above.

Figure 8:
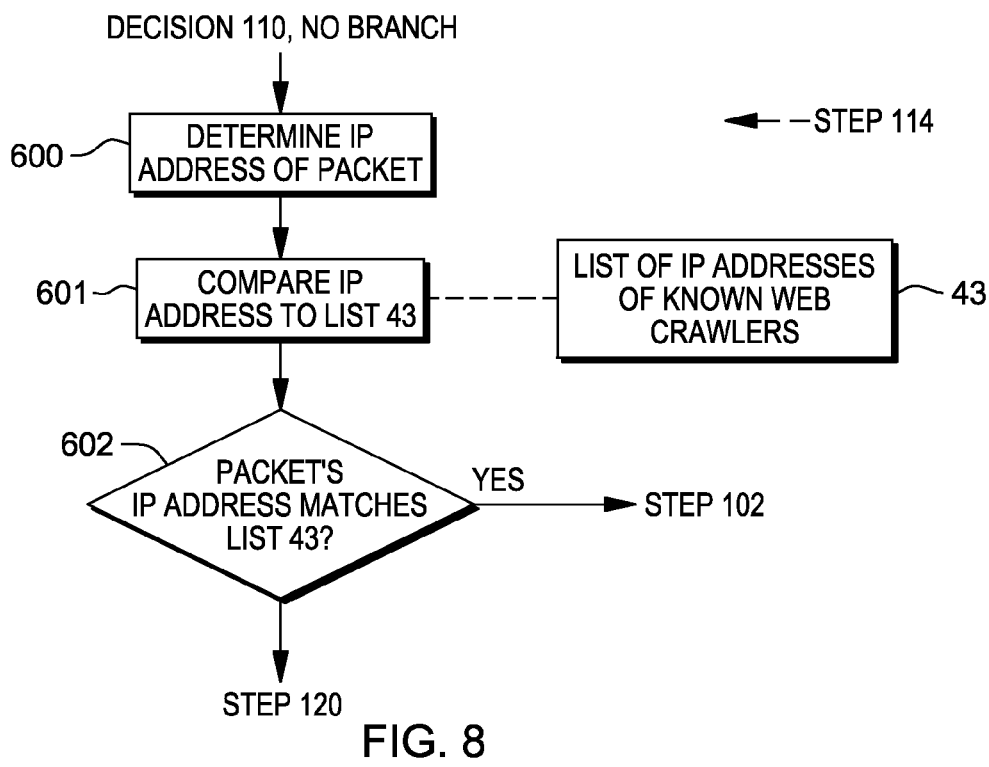
FIG. 8 is a flow chart illustrating a program function within the honeypot packet filtering program of FIG. 2 which determines if the current packet is harmless web crawler traffic.

FIG. 8 illustrates in more detail decision 114 of FIG. 2 (i.e. determining if the current packet is web crawler traffic presumed to be harmless). Honeypot 12 maintains a list 43 of known web crawler servers, and their respective IP addresses. In step 600, program 30 determines the IP address of the current packet by parsing the packet header. Then, program 30 compares the IP address of the current packet to those in list 43 (step 601). If there is a match (decision 602, yes branch), then program 30 proceeds to step 102 as described above. However, if there is not a match, then program 30 proceeds to decision 120 as described above.

Figure 9:
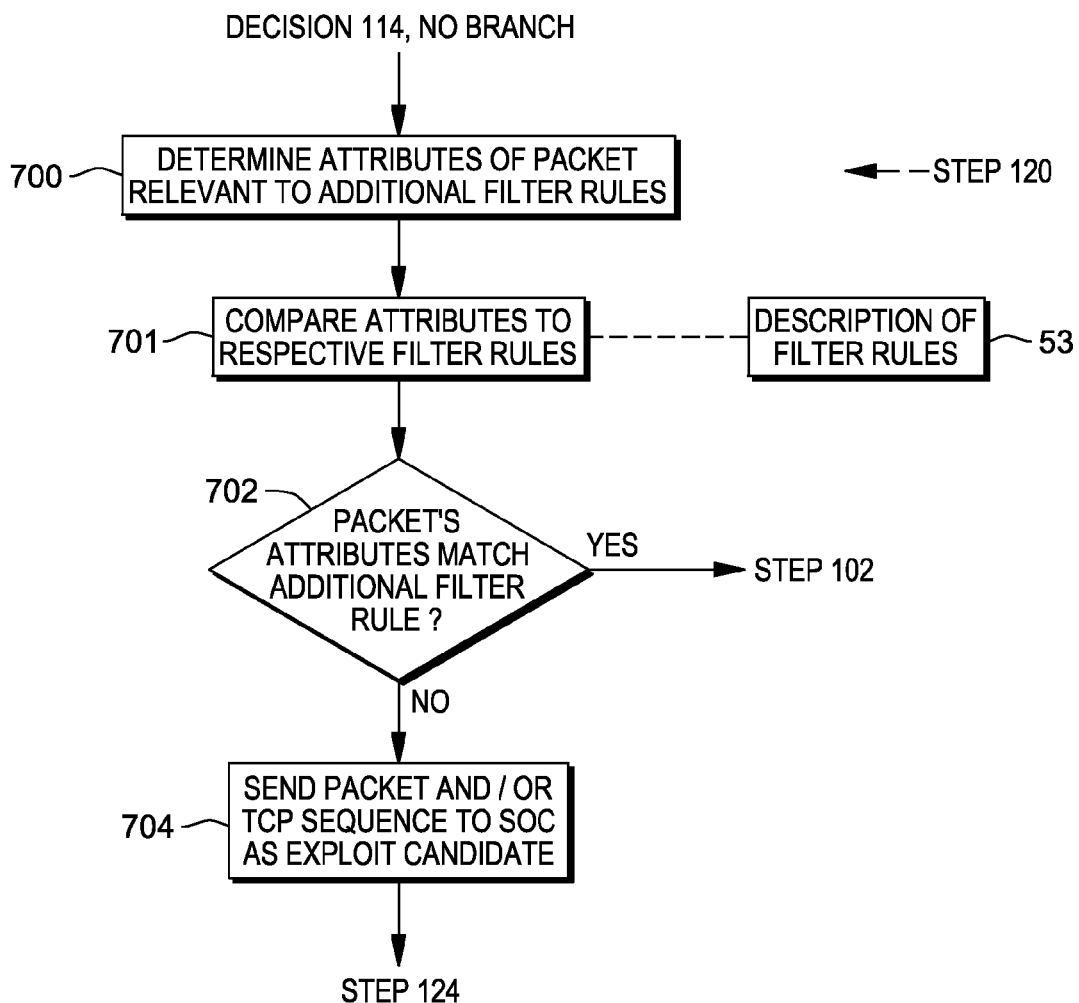
FIG. 9 is a flow chart illustrating a program function within the honeypot packet filtering program of FIG. 2 which determines if the current packet matches any of the other filter rules of the honeypot 12.

FIG. 9 illustrates in more detail decision 120 of FIG. 2 (i.e. determining if the current packet matches any of the additional filter rules of program 30). Program 30 maintains a list and description 53 of additional "filter rules" which will deem a packet as harmless or otherwise not being a new exploit candidate. The following is an example of these rules:

Ignore packets containing the word "foo" in the payload originating from the IP address 192.168.0.1, because for some reason, the SOC analyst finds this in many alerts sent by program 30, even though the packet is harmless.

Each of the rules involves a comparison of some attribute of the packet to a respective criteria in the additional filter rule. So, in step 700 program 30 determines the attributes of the current packet relevant to the additional filter rules. Then, program 30 compares the attributes to the respective filter rule (step 701). The comparison to the "foo" rule is performed by examining the packet payload for the word "foo", then examining the source IP address of the packet. Once this information is gathered, a comparison is made. If the current packet matches any of the rules in list 53 (decision 702, yes branch) then program 30 proceeds to step 102 as described above. If not, then the packet is deemed an exploit candidate. Consequently, program 30 sends the current packet (or an identification of the current packet) as an alert to SOC 40 (step 704). SOC 40 can extract the TCP sequence number of the packet from the header (or the identification of the current packet can be the TCP sequence number). With this TCP sequence, SOC 40 can assemble all the packets of the sequence if they are all sent by program 30. However, if program 30 is programmed to send only one packet in the sequence, then a human analyst from SOC 40 can manually query program 30 for the other packets in the sequence. Thus, the entire packet sequence/message will be analyzed by the human analyst as a possible, new exploit (for example, new computer virus, worm or exploitation program). If SOC 40 identifies the current packet sequence as a new exploit, then SOC 40 will identify a signature of the new exploit by looking for a distinctive aspect of the exploit such as distinctive sequence of lines of code. Then, SOC 40 will notify administrators of firewalls and servers of the new intrusion program and its signature. Then, the administrators can guard against the new intrusion program, either by blocking its passage through the firewall or its receipt by the server, or by installation of new anti-virus, anti-worm or other anti-exploitation program software that will detect and delete the exploit or prevent it from executing.

Based on the foregoing, a technique to detect new exploits has been described. However, numerous modifications and substitutions can be made without deviating from the scope of the present invention. For example, lists 13, 23, 33, 43 and 53 can be combined, and one search of the packet's respective attributes can be conducted into the combined list to look for a match. Therefore, the present invention has been disclosed by way of illustration and not limitation, and reference should be made to the following claims to determine the scope of the present invention.

The invention claimed is:

1. A computer program product for automatically determining if a packet is a new, exploit candidate, the computer program product comprising:
    a computer-readable tangible storage device;
    first program instructions to determine if the packet is a known exploit;
    second program instructions to determine if the packet is addressed to a broadcast IP address of a network;
    third program instructions to determine if the packet is network administration traffic;
    fourth program instructions, responsive to the packet being a known exploit OR the packet being addressed to a broadcast IP address of a network OR the packet being network administration traffic, to determine that the packet is not a new, exploit candidate; and
    fifth program instructions, responsive to the packet not being a known exploit AND the packet not being addressed to a broadcast IP address of a network AND the packet not being network administration traffic AND the packet not being another type of traffic known to be benign, to determine and report that the packet is a new, exploit candidate; and wherein
    the first, second, third, fourth and fifth program instructions are stored on the computer-readable tangible storage device.

2. The computer program product of claim 1 further comprising:
    sixth program instructions to determine if the packet is web crawler traffic; and wherein
    the fourth program instructions are responsive to the packet being a known exploit OR the packet being addressed to a broadcast IP address of a network OR the packet being network administration traffic OR the packet being web crawler traffic, to determine that the packet is not a new, exploit candidate; and
    the fifth program instructions are responsive to the packet not being a known exploit AND the packet not being addressed to a broadcast IP address of a network AND the packet not being network administration traffic AND the packet not being web crawler traffic, to determine that the packet is a new, exploit candidate; and
    the sixth program instructions are stored on the computer-readable tangible storage device.

3. The computer program product of claim 1 wherein the first program instructions determine if the packet is a known exploit by searching the packet for a known signature of a known exploit.

4. The computer program product of claim 1 wherein the first program instructions determine if the packet is a known exploit by comparing an identity of the packet to one or more identities, sent by an intrusion detection system, of respective packet(s) which the intrusion detection system determined to contain a known exploit.

5. The computer program product of claim 1 wherein the packet was received by a honeypot computing device at an unused IP address, and the computer program product is installed and executed at the honeypot computing device.

6. The computer program product of claim 1 further comprising:
    sixth program instructions, responsive to the fifth program instructions determining that the packet is a new exploit candidate, to determine a signature of the packet, and report the new exploit candidate and the signature to an administrator; and wherein
    the sixth program instructions are stored on the computer-readable tangible storage device.

7. The computer program product of claim 6 wherein responsive to the fourth program instructions determining that the packet is not a new, exploit candidate, a signature of the packet not being determined.

8. The computer program product of claim 1 wherein the second program instructions determine if the packet is addressed to a broadcast IP address of the network by comparing a destination IP address of the packet to a gateway IP address of the network and a netmask of the network which identifies a broadcast IP address of the network.

9. A computer program product for automatically determining if a packet is a new, exploit candidate, the computer program product comprising:
    a computer-readable tangible storage device;
    first program instructions to determine if the packet is a known exploit;
    second program instructions to determine if the packet is addressed to a broadcast IP address of a network;
    third program instructions to determine if the packet is network administration traffic;
    fourth program instructions, responsive to the packet being a known exploit OR the packet being addressed to a broadcast IP address of a network OR the packet being network administration traffic, to determine that the packet is not a new, exploit candidate; and
    fifth program instructions, responsive to the packet not being a known exploit AND the packet not being addressed to a broadcast IP address of a network AND the packet not being network administration traffic AND the packet not being another type of traffic known to be benign, to determine and report that the packet is a new, exploit candidate; and wherein the first, second, third, fourth and fifth program instructions are stored on the computer-readable tangible storage device;

the second program instructions also determine if the packet has a protocol listed in a list of protocols previously determined to be harmless network broadcast traffic;

the fourth program instructions are responsive to the packet being a known exploit OR the packet being addressed to a broadcast IP address of a network OR the packet being network administration traffic OR the packet having a protocol listed in a list of protocols previously determined to be harmless network broadcast traffic, to determine that the packet is not a new, exploit candidate; and the fifth program instructions are responsive to the packet not being a known exploit AND the packet not being addressed to a broadcast IP address of a network AND the packet not being network administration traffic AND the packet not having a protocol listed in a list of protocols previously determined to be harmless network broadcast traffic, to determine and report that the packet is a new, exploit candidate.

10. A computer program product for automatically determining if a packet is a new, exploit candidate, the computer program product comprising:

a computer-readable tangible storage device;

first program instructions to determine if the packet is a known exploit;

second program instructions to determine if the packet is addressed to a broadcast IP address of a network;

third program instructions to determine if the packet is network administration traffic;

fourth program instructions, responsive to the packet being a known exploit OR the packet being addressed to a broadcast IP address of a network OR the packet being network administration traffic, to determine that the packet is not a new, exploit candidate; and fifth program instructions, responsive to the packet not being a known exploit AND the packet not being addressed to a broadcast IP address of a network AND the packet not being network administration traffic AND the packet not being another type of traffic known to be benign, to determine and report that the packet is a new, exploit candidate; and wherein the first, second, third, fourth and fifth program instructions are stored on the computer-readable tangible storage device; and the third program instructions determine if the packet is network administration traffic by comparing an IP protocol and IP address of the packet to a list of combinations of IP protocols and IP addresses previously determined to be network administration traffic.

11. A computer program product for automatically determining if a packet is a new, exploit candidate, the computer program product comprising:

a computer-readable tangible storage device;

first program instructions to determine if the packet is a known exploit;

second program instructions to determine if the packet is addressed to a broadcast IP address of a network;

third program instructions to determine if the packet is network administration traffic;

fourth program instructions, responsive to the packet being a known exploit OR the packet being addressed to a broadcast IP address of a network OR the packet being network administration traffic, to determine that the packet is not a new, exploit candidate; and fifth program instructions, responsive to the packet not being a known exploit AND the packet not being addressed to a broadcast IP address of a network AND the packet not being network administration traffic AND the packet not being another type of traffic known to be benign, to determine and report that the packet is a new, exploit candidate;

sixth program instructions to determine if the packet is web crawler traffic; and wherein the fourth program instructions are responsive to the packet being a known exploit OR the packet being addressed to a broadcast IP address of a network OR the packet being network administration traffic OR the packet being web crawler traffic, to determine that the packet is not a new, exploit candidate; and the fifth program instructions are responsive to the packet not being a known exploit AND the packet not being addressed to a broadcast IP address of a network AND the packet not being network administration traffic AND the packet not being web crawler traffic, to determine that the packet is a new, exploit candidate; and the first, second, third, fourth, fifth and sixth program instructions are stored on the computer-readable tangible storage device; and the sixth program instructions determine if the packet is web crawler traffic by comparing an IP address of the packet to a list of IP addresses of known web crawlers.

12. The computer program product of claim 1 further comprising sixth program instructions, responsive to the packet not being a known exploit AND the packet not being network broadcast traffic AND the packet not being addressed to a broadcast IP address of a network AND the packet not being another type of traffic known to be benign, to identify a sequence of packets including the first said packet, the sequence of packets being a new, exploit candidate; and wherein the sixth program instructions are stored on the computer-readable tangible storage device.

13. A computer program product for automatically determining if a packet is a new, exploit candidate, the computer program product comprising:

a computer-readable tangible storage device;

first program instructions to determine if the packet is a known exploit;

second program instructions to determine if the packet is addressed to a broadcast IP address of a network;

third program instructions to determine if the packet has a protocol listed in a list of protocols previously determined to be harmless broadcast traffic;

fourth program instructions to determine if the packet is network administration traffic;

fifth program instructions, responsive to the packet being a known exploit OR the packet being addressed to a broadcast IP address of a network OR the packet being network administration traffic OR the packet having a protocol listed in a list of protocols previously determined to be harmless broadcast traffic, to determine that the packet is not a new, exploit candidate; and sixth program instructions, responsive to the packet not being a known exploit AND the packet not being addressed to a broadcast IP address of a network AND the packet not being network administration traffic AND the packet not having a protocol listed in a list of protocols previously determined to be harmless broadcast traffic, to determine and report that the packet is a new, exploit candidate; and wherein the first, second, third, fourth, fifth and sixth program instructions are stored on the computer-readable tangible storage device.

14. The computer program product of claim 13 further comprising:

seventh program instructions to determine if the packet is web crawler traffic; and wherein the fifth program instructions are responsive to the packet being a known exploit OR the packet being addressed to a broadcast IP address of a network OR the packet being network administration traffic OR the packet being web crawler traffic OR the packet having a protocol listed in a list of protocols previously determined to be harmless broadcast traffic, to determine that the packet is not a new, exploit candidate; and the sixth program instructions are responsive to the packet not being a known exploit AND the packet not being addressed to a broadcast IP address of a network AND the packet not being network administration traffic AND the packet not being web crawler traffic AND the packet not being other traffic known to be benign AND the packet not having a protocol listed in a list of protocols previously determined to be harmless broadcast traffic, to determine that the packet is a new, exploit candidate; and the seventh program instructions are stored on the computer-readable tangible storage device.

15. The computer program product of claim 13 further comprising:

seventh program instructions, responsive to the sixth program instructions determining that the packet is a new, exploit candidate, to determine a signature of the packet or a sequence of packets including the first the packet, and report the new, exploit candidate and the signature to an administrator; and wherein the seventh program instructions are stored on the computer-readable tangible storage device.

16. The computer program product of claim 13 wherein the second program instructions determine if the packet is addressed to a broadcast IP address of the network by comparing a destination IP address of the packet to a gateway IP address of the network and a netmask of the network which identifies a broadcast IP address of the network.

17. A computer system for automatically determining if a packet is a new, exploit candidate, the computer system comprising:

one or more processors, one or more computer-readable memories, one or more computer-readable tangible storage devices, and program instructions stored on at least one of the one or more storage devices for execution by one of the one or more processors via at least one of the one or more memories, the program instructions comprising:

first program instructions to determine if the packet is a known exploit;

second program instructions to determine if the packet is addressed to a broadcast IP address of a network;

third program instructions to determine if the packet is network administration traffic;

fourth program instructions, responsive to the packet being a known exploit OR the packet being addressed to a broadcast IP address of a network OR the packet being network administration traffic, to determine that the packet is not a new, exploit candidate; and fifth program instructions, responsive to the packet not being a known exploit AND the packet not being addressed to a broadcast IP address of a network AND the packet not being network administration traffic AND the packet not being another type of traffic known to be benign, to determine and report that the packet is a new, exploit candidate.

18. The computer system of claim 17 further comprising:

sixth program instructions, stored on at least one of the one or more storage devices for execution by at least one of the one or more processors via at least one of the one or more memories, to determine if the packet is web crawler traffic; and wherein the fourth program instructions are responsive to the packet being a known exploit OR the packet being addressed to a broadcast IP address of a network OR the packet being network administration traffic OR the packet being web crawler traffic, to determine that the packet is not a new, exploit candidate; and the fifth program instructions are responsive to the packet not being a known exploit AND the packet not being addressed to a broadcast IP address of a network AND the packet not being network administration traffic AND the packet not being web crawler traffic, to determine that the packet is a new, exploit candidate.

19. The computer system of claim 17 wherein the packet was received by a honeypot computing device at an unused IP address, and the first, second, third, fourth and fifth program instructions are executed at the honeypot computing device.

20. The computer system of claim 17 further comprising:

sixth program instructions, stored on at least one of the one or more storage devices for execution by at least one of the one or more processors via at least one of the one or more memories, responsive to the fifth program instructions determining that the packet is a new exploit candidate, to determine a signature of the packet, and report the new exploit candidate and the signature to an administrator.

* * * * *